United States Patent [19]
Murata et al.

[11] Patent Number: 6,119,140
[45] Date of Patent: Sep. 12, 2000

[54] TWO-DIMENSIONAL INVERSE DISCRETE COSINE TRANSFORM CIRCUIT AND MICROPROCESSOR REALIZING THE SAME AND METHOD OF IMPLEMENTING 8×8 TWO-DIMENSIONAL INVERSE DISCRETE COSINE TRANSFORM

[75] Inventors: Eri Murata; Ichiro Kuroda, both of Tokyo, Japan

[73] Assignee: NEC Corporation, Tokyo, Japan

[21] Appl. No.: 09/004,330

[22] Filed: Jan. 8, 1998

[30] Foreign Application Priority Data

Jan. 8, 1997 [JP] Japan ..................... 9-001090

[51] Int. Cl.[7] ................................. G06F 17/14
[52] U.S. Cl. ........................... 708/402; 708/401
[58] Field of Search ..................... 708/401, 402

[56] References Cited

U.S. PATENT DOCUMENTS

| | | | |
|---|---|---|---|
| 5,428,567 | 6/1995 | Horvath et al. | 708/401 |
| 5,590,066 | 12/1996 | Ohki | 708/401 |
| 5,768,167 | 6/1998 | Kuroda | 708/401 |
| 5,781,239 | 7/1998 | Mattela et al. | 708/401 |
| 5,835,391 | 11/1998 | Cho | 708/401 |
| 5,905,660 | 5/1999 | Choi et al. | 708/401 |
| 5,917,736 | 6/1999 | Murata et al. | 708/401 |

OTHER PUBLICATIONS

Ide et al., "Stidy of IDCT Algorithms by 16–bit Integer Operation" D–225 pp. 227 (1996).

Mochizuki et al., "Inverse DCT calculation on VISP–LSI" A–192 (1990).

Arai et al., "A Fast DCT–SQ Scheme for Images" The IEICE 71:1095–1097.

*Primary Examiner*—David H. Malzahn
*Attorney, Agent, or Firm*—Foley & Lardner

[57] ABSTRACT

An 8×8 two-dimensional discrete inverse cosine transform circuit includes two row arithmetic sections each of which implement an 8-point one-dimensional inverse discrete cosine transform in a row direction, a replacement section which replaces the arithmetic results of the row arithmetic sections with replacement data, and two column arithmetic sections each of which receive parts of the replacement data from the replacement section and implement an 8-point one-dimensional inverse discrete cosine transform in a column direction. Each of the arithmetic sections include a 16-bit four parallel adder and subtracter and a 16-bit four parallel multiply-accumulate unit with polarity symmetric rounding function.

10 Claims, 5 Drawing Sheets

16-BIT FOUR-PARALLEL ADDER AND SUBTRACTER

FIG.4

16-BIT FOUR PARALLEL MULTIPLY-ACCUMULATE UNIT WITH POLARITY SYMMETRIC ROUNDING FUNCTION

FIG.5

16-BIT MULTIPLICATION
WITH POLARITY SYMMETRIC ROUNDING

FIG. 6
(PRIOR ART)

TWO-DIMENSIONAL INVERSE DISCRETE COSINE TRANSFORM CIRCUIT AND MICROPROCESSOR REALIZING THE SAME AND METHOD OF IMPLEMENTING 8×8 TWO-DIMENSIONAL INVERSE DISCRETE COSINE TRANSFORM

BACKGROUND OF THE INVENTION

The present invention relates to a circuit that realizes two-dimensional inverse discrete cosine transform (IDCT) used for time-varying image signal processing in four parallel mode by 16-bit integer arithmetic operation. The present invention relates to a processor that realizes the two-dimensional IDCT circuit and a method of implementing the two-dimensional IDCT.

In recent years, microprocessors tend to employ arithmetic commands in split ALU scheme for high-speed image processing. Here, arithmetic commands in the split ALU scheme means commands each for utilizing a 64-bit ALU as four 16-bit arithmetic units. Utilization of the split ALU scheme allows signals and images including data with parallelism to be easily processed at high speed.

However, when two-dimensional inverse discrete cosine transform is performed in four split mode, the arithmetic error in the 16-bit integer arithmetic operation becomes large. Hence, the arithmetic error cannot satisfy the error criterion defined by "IEEE Standard Specifications for the Implementations of 88 Inverse Discrete Cosine Transform", Std 1180–1190, Dec. 6, 1990.

A scheme for decreasing arithmetic errors and satisfying the error criterion is disclosed in the paper on "A study of IDCT Algorithms by 16-bit Integer Operation", in the 1996 Institute of Electronics, Information and Communication Engineers, System Society Convention, D-225, (hereinafter, referred to as "conventional scheme 1").

Figure 6:
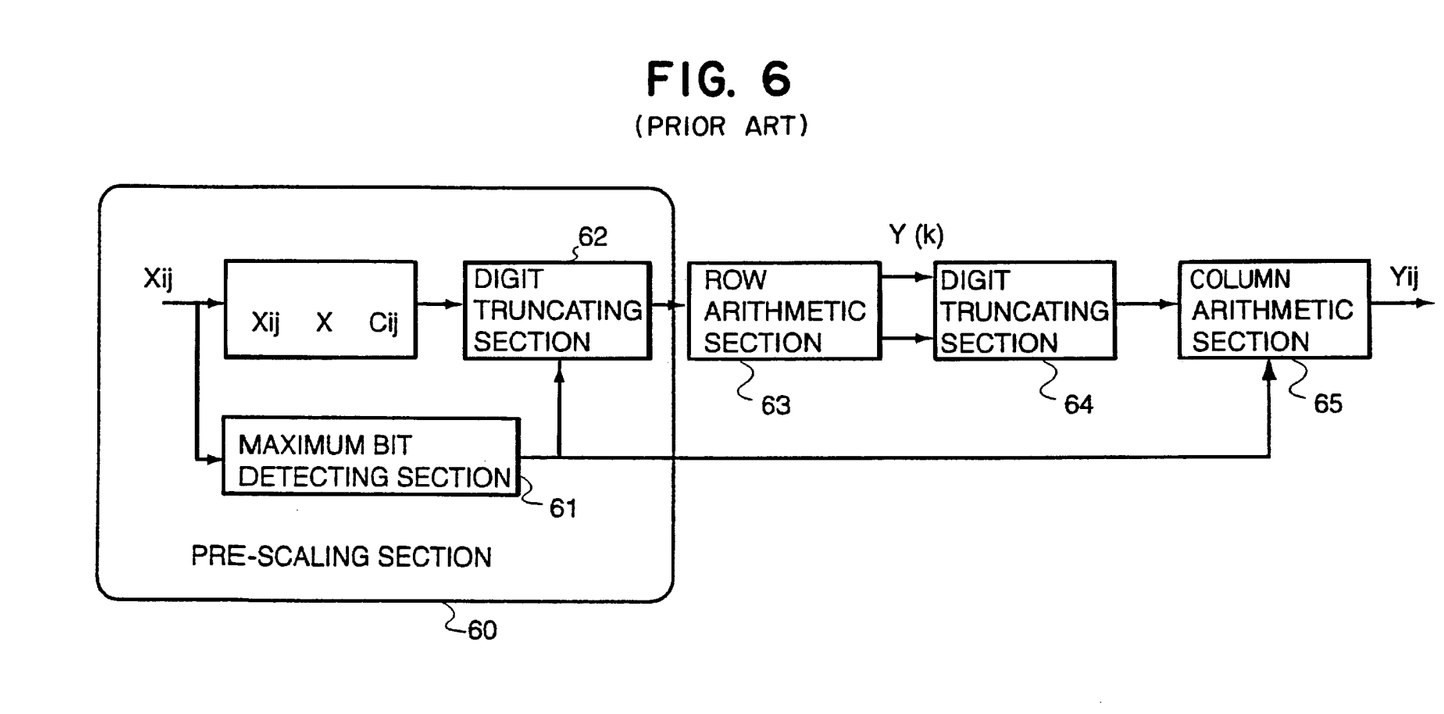
FIG. 6 is a block circuit diagram showing the configuration of an 8×8 two-dimensional inverse discrete cosine transform circuit according to the conventional scheme 1.

FIG. 6 shows the configuration of the two-dimensional inverse discrete cosine transform according to the conventional scheme 1. In the conventional scheme 1, the 8×8 two-dimensional discrete inverse cosine transform is realized by separately executing 8-point one-dimensional inverse discrete cosine transform in the row direction and 8-point one-dimensional inverse discrete cosine transform in the column direction. The scheme proposed by the paper "A Fast DCT-SQ Scheme for Images", Y. Arai, T. Agui and M. Nakajima, Trans. IEICE, Vol. 71, No. 11, November 1988, pp. 1095–1097 is used as the 8-point one-dimensional inverse discrete cosine transform.

In the conventional scheme 1, the maximum bit detector 61 first detects the maximum bit as pre-scaling. Then the first digit truncating section 62 adaptively truncates digits for every row according to the detected result. Average precision degradation is suppressed by inputting the truncated value. The row arithmetic section 63 prepares three special instructions including addition with history, conditional addition, and conditional product. The column arithmetic section 63 implements 8-point one-dimensional discrete inverse cosine transform using the three special instructions to suppress arithmetic errors due to 16-bit integer arithmetic operation. The second digit truncating section 64 truncates the digit of the arithmetic result from the column arithmetic section 63 based on a digit truncation history of each column and the number of carry digits of the pre-scaling section 60. The column arithmetic section 65 realizes 8-point one-dimensional and two-dimensional inverse discrete cosine transform using the special instructions and then carries digits in each column to clear the digit truncation history, whereby the arithmetic result of the 8×8 two-dimensional discrete inverse cosine transform is obtained.

The technique disclosed in the paper, "Inverse DCT Calculation on VISP-LSI" in the 1996 Institute of Electronics, Information and Communication Engineers, Spring National Convention, A-192 is well known as another scheme (hereinafter referred to as conventional scheme 2). In this scheme, in order to express the product of 16 bits ×16 bits in the 16-bit form, 16 bits are truncated by adding 1 to the 15th bit counted from the least significant bit and a polarity symmetric rounding is executed to convert the final arithmetic result into an integer, so that the arithmetic errors associated with the 16-bit integer arithmetic operation is suppressed.

However, the conventional schemes 1 and 2 have the following disadvantages. In order to suppress arithmetic errors caused by the 16-bit integer arithmetic, the scheme 1 requires the maximum bit detection by the maximum bit detecting section 61, digit truncation by the first and second digit truncating sections 62 and 64, and digit carrying operation by the column arithmetic section 65. This leads to an increase in arithmetic computation amount. Moreover, requiring three special instructions including addition with history, conditional addition, and conditional product results in a large-sized circuit.

In order to suppress arithmetic errors caused by the 16-bit integer arithmetic operation, the scheme 2 requires the 16-bit operation rounding process and the polarity symmetric rounding process for integer conversion, thus resulting in an increase in arithmetic computation amount.

Moreover, in order realize high-speed 8×8 two-dimensional discrete inverse cosine transform, 16-bit integer operation must be realized in a parallel mode using split ALU operations.

SUMMARY OF THE INVENTION

The present invention is made to solve the above-mentioned problems. The objective of the present invention is to provide an 8×8 two-dimensional discrete inverse cosine transform circuit that can suppress arithmetic errors without an increase in arithmetic amount when 8×8 two-dimensional discrete inverse cosine transform at high speed is realized by implementing 16-bit integer arithmetic operation in four parallel mode.

Another objective of the present invention is to provide a microprocessor that realizes 8×8 two-dimensional discrete inverse cosine transform.

Still another objective of the present invention is to provide a method of implementing 8×8 two-dimensional discrete inverse cosine transform.

The objective of the present invention is accomplished merely by adding sole special operation to normal split ALU operations for addition, subtraction, and so on to implement 16-bit four parallel multiply-accumulate operation with polarity symmetric rounding function.

The objective of the present invention is achieved by an 8×8 two-dimensional discrete inverse cosine transform circuit that performs an 8-point one-dimensional inverse discrete cosine transform in a row direction and then performs an 8-point one-dimensional discrete inverse cosine transform in a column direction based on the result of the 8-point one-dimensional inverse discrete cosine transform in a row direction, so that 8×8 two-dimensional discrete inverse cosine transform is realized, comprising a first row arithmetic section for realizing a first 8-point one-dimensional inverse discrete cosine transform of the former part of DCT (Discrete Cosine Transform) coefficient Xji in four parallel mode to obtain a first arithmetic result, wherein i represents a horizontal address having an integer of 0 to 7, j represents a vertical address having an integer of 0 to 7, and said DCT coefficients Xij are represented by executing horizontal direction transform and vertical direction transform and shifting by four bits leftward; a second row arithmetic section for realizing a second 8-point one-dimensional inverse discrete cosine transform of the latter part of DCT coefficient Xji in four parallel mode to obtain a second arithmetic result; a replacement section for implementing a horizontal replacement of said first arithmetic result to output a first replacement result and implementing a vertical replacement of the second arithmetic result to output a second replacement result; a first column arithmetic section for realizing a third 8-point one-dimensional inverse discrete cosine transform of the first substitution result in four parallel mode and performing integer conversion to obtain a third arithmetic result; and a second column arithmetic section for realizing a fourth 8-point one-dimensional inverse discrete cosine transform of the second substitution result in four parallel mode and performing integer conversion to obtain a fourth arithmetic result; whereby the third arithmetic result and the fourth arithmetic result are output as arithmetic results of the 8×8 two-dimensional discrete inverse cosine transform.

According to the present invention, a microprocessor for 8×8 two-dimensional discrete inverse cosine transform has a 16-bit four parallel addition and subtraction instruction and a 16-bit four parallel multiply-accumulate command with polarity symmetric rounding function. The 16-bit four parallel addition and subtraction command is a command that implements an adding and subtracting operation of 16-bit data in four parallel mode. The 16-bit four parallel multiply-accumulate operation with said polarity symmetric rounding operation is a command that implements an multiply-accumulate operation with polarity symmetric rounding operation in four parallel mode by adding 0×4000 (in hexadecimal notation) to a 16×16 bit multiplication result when the 16×16 bit multiplication result is positive, or adding 0×3fff (in hexadecimal notation) to a 16×16 bit multiplication result when the 16×16 bit multiplication result is negative, truncating the upper 16 bits containing one sign bit from the resultant sum, and adding the truncated 16-bit data to 16-bit data.

Furthermore, according to the present invention, a method of implementing 8×8 two-dimensional discrete inverse cosine transform, comprises the steps of realizing a first 8-point one-dimensional inverse discrete cosine transform of the former part of a DCT (Discrete Cosine Transform) coefficient Xji in four parallel mode to obtain a first arithmetic result, wherein i represents a horizontal address having an integer of 0 to 7, j represents a vertical address having an integer of 0 to 7, and the DCT coefficient Xij is represented by executing horizontal direction transform and vertical direction transform and shifting by four bits leftward; realizing a second 8-point one-dimensional inverse discrete cosine transform of the latter part of said DCT coefficient Xji in four parallel mode to obtain a second arithmetic result; implementing a horizontal replacement of the first arithmetic result to output a first replacement result and implementing a vertical replacement of the second arithmetic result to output a second replacement result; realizing a third 8-point one-dimensional inverse discrete cosine transform of the first replacement result in four parallel mode and performing integer conversion to obtain a third arithmetic result; realizing a fourth 8-point one-dimensional inverse discrete cosine transform of the second substitution result in four parallel mode and performing integer conversion to obtain a fourth arithmetic result; and outputting the third arithmetic result and the fourth arithmetic result as arithmetic results of the 8×8 two-dimensional discrete inverse cosine transform.

According to the present invention, the method further comprises the steps of realizing addition and subtraction of 16-bit data in four parallel mode, adding 0×4000 (in hexadecimal notation) to a multiplication result when the multiplication result of (16 bits×16 bits) is positive, or adding 0×3fff (in hexadecimal notation) to a multiplication result when the multiplication result of (16 bits×16 bits) is negative, truncating the upper 16 bits containing one sign bit, and then adding 16-bit data to the truncated 16-bit data.

Moreover, according to the present invention, the method further comprises the steps of writing the former part of the DCT coefficient Xji (X0i, X1i, X2i, X3i) as first input data into a first register file, implementing a multiply-accumulate operation of the first input data by means of a first 16-bit four parallel multiply-accumulate unit with polarity symmetric rounding function, implementing an adding and subtracting operation by means of a first 16-bit four parallel adder and subtracter, and then storing the first arithmetic result (X'0i, X'1i, X'2i, X'3i) into the first register file; writing the latter part of the DCT coefficient Xji (X4i, X5i, X6i, X7i) as second input data into a second register file, implementing a multiply-accumulate operation of the second input data by means of a second 16-bit four parallel multiply-accumulate unit with polarity symmetric rounding function, implementing an adding and subtracting operation by means of a second 16-bit four parallel adder and subtracter, and then storing the second arithmetic result (X'4i, X'5i, X'6i, X7i) into the second register file; substituting horizontally and vertically said first arithmetic result (X'0i, X'1i, X'2i, X'3i) and the second arithmetic result (X'4i, X'5i, X'6i, X'7i), storing horizontally and vertically the first replacement result (X'i4, X'i5, X'i6, X'i7) into a third register file and storing the second replacement result (X'i0, X'i1, X'i2, X'i3) into a fourth register file; implementing a multiply-accumulate of the first replacement data as third input data stored in the third register file by means of a third 16-bit four parallel multiply-accumulate unit with polarity symmetric rounding function, implementing an adding and subtracting operation by means of a third 16-bit four parallel adder and subtracter, so that the third 8-point one dimensional inverse discrete cosine transform is realized in four parallel mode and an integer operation is performed by means of the third 16-bit four parallel multiply-accumulate unit with polarity symmetric rounding function; and implementing a multiply-accumulate of the second replacement data as fourth input data stored in a fourth register file by means of the fourth 16-bit four parallel multiply-accumulate unit with polarity symmetric rounding function, implementing an adding and subtracting operation by means of a fourth 16-bit four parallel adder and subtracter, so that the fourth 8-point one dimensional inverse discrete cosine transform is realized in four parallel mode and an integer operation is performed by means of the fourth 16-bit four parallel multiply-accumulate unit with polarity symmetric rounding function.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Next, an embodiment of the present invention will be described below in detail with reference to the attached drawings. In the present invention, it is assumed that i represents a horizontal address having an integer of 0 to 7; and j represents a vertical address having an integer of an integer of 0 to 7. Xij represents a DCT coefficient which is subjected vertically and horizontally to transform and is shifted four bits leftward. A multiplication coefficient $Cn=\cos(n*p/16)$ (where n=1, 2, 3, 4, 5, 6, 7) is multiplied by 215.

Figure 1:
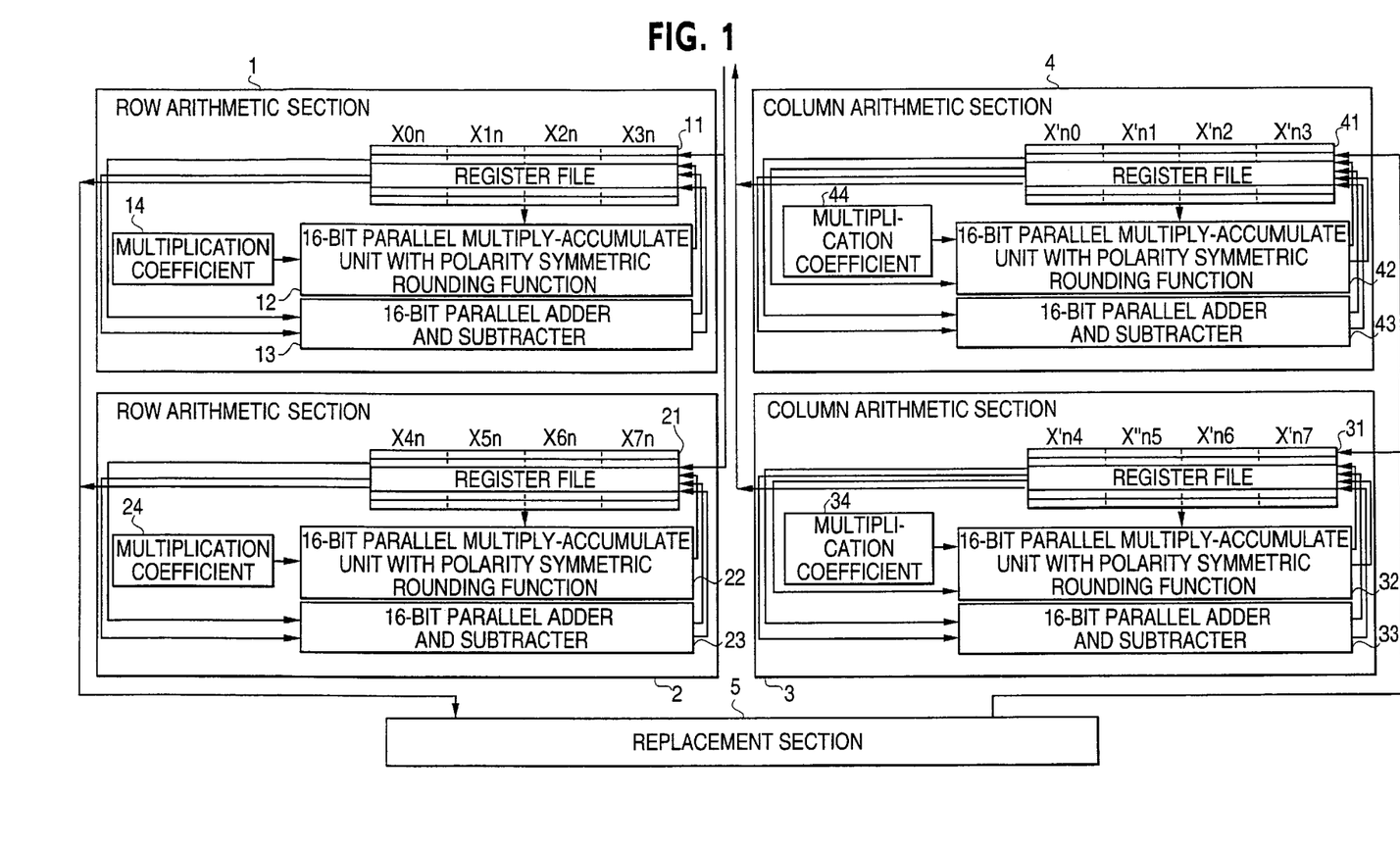
FIG. 1 is a block circuit diagram showing the configuration of an 8×8 two-dimensional inverse discrete cosine transform circuit according to an embodiment of the present invention.

FIG. 1 illustrates an 8×8 two-dimensional inverse discrete cosine transform circuit according to an embodiment of the present invention. The 8×8 two-dimensional inverse discrete cosine transform circuit consists of a first row arithmetic section 1, a second row arithmetic section 2, a first column arithmetic section 3, a second column arithmetic section 4, and a replacement section 5. The first and second arithmetic sections 1 and 2 and the first and second column arithmetic sections 3 and 4 have the same configuration. In this embodiment, the first row arithmetic section 1 is referred to as a first arithmetic section. The second row arithmetic section 2 is referred to as a second arithmetic section. The first column arithmetic section 3 is referred to as a third arithmetic section. The fourth column arithmetic section 4 is referred to as fourth arithmetic section.

That is, the first row arithmetic section (first arithmetic section) 1 consists of a first register file 11, a first 16-bit parallel multiply-accumulate section 12 with polarity rounding function, a first 16-bit four parallel adder and subtracter 13, and a first multiplication coefficient holding section 14. The second row arithmetic section (second arithmetic section) 2 consists of a second register file 21, a second 16-bit parallel multiply-accumulate section 22 with polarity rounding function, a second 16-bit four parallel adder and subtracter 23, and a second multiplication coefficient holding section 24. The first column arithmetic section (third arithmetic section) 3 consists of a third register file 31, a third 16-bit parallel multiply-accumulate section 32 with polarity symmetric rounding function, a third 16-bit four parallel adder and subtracter 33, and a third multiplication coefficient holding section 34. The second column arithmetic section (fourth arithmetic section) 4 consists of a four register file 41, a four 16-bit parallel multiply-accumulate section 42 with polarity symmetric rounding function, a four 16-bit four parallel adder and subtracter 43, and a four multiplication coefficient holding section 44.

The first row arithmetic section (first arithmetic section) 1, the DCT coefficient Xij writes to the first register file 11 every four pieces of data (X0n . . . X3n) represented with (X00, X10, X20, X30), (X01, X11, X21, X31), (X02, X12, X22, X32), (X03, X13, X23, X33), (X04, X14, X24, X34), (X05, X15, X25, X35), (X06, X16, X26, X36), or (X07, X17, X27, X37) and then implements the first 8-point one-dimensional inverse discrete cosine transform of data in the first register file 11 as first data. The first 8-point one-dimensional inverse discrete cosine transform is realized in four parallel mode by means of the first 16-bit parallel multiply-accumulate unit 12 with first polarity symmetric rounding function and the first 16-bit four parallel adder and subtracter 13. The result of the first 8-point one-dimensional inverse discrete cosine transform is written into the first register file 11.

Similarly, a second row arithmetic section (second arithmetic section) 2 writes the DCT coefficient Xij to the first register file 11 every four data represented (X4n . . . X7n) with (X40, X50, X60, X70), (X41, X51, X61, X71), (X42, X52, X62, X72), (X43, X53, X63, X73), (X44, X54, X64, X74), (X45, X55, X65, X75), (X46, X56, X66, X76), or (X47, X57, X67, X77) and then implements the first 8-point one-dimensional inverse discrete cosine transform of data in the second register file 21 as first data. The second 8-point one-dimensional inverse discrete cosine transform is realized in four parallel mode by means of the second 16-bit parallel multiply-accumulate unit 22 with first polarity symmetric rounding function and the second 16-bit four parallel adder and subtracter 23. The result of the second 8-point one-dimensional inverse discrete cosine transform is written into the second register file 21.

It is assumed that X'ij represents the result of first row arithmetic section 1 and the result of the second arithmetic section 2.

The replacement section 5 executes horizontal and vertical replacements of the arithmetic result X'ij from the first and second arithmetic sections 1 and 2. Thus, (X'n4, X'n5, X'n6, X'n7) is stored into the third register file 31. (X'n0, X'n1, X'n2, X'n3) is stored into the fourth register file 41.

The third register file stores data represented by (X'04, X'05, X'06, X'07), (X'14, X'15, X'16, X'17), (X'24, X'25, X'26, X'27), (X'34, X'35, X'36, X'37), (X'44, X'45, X'46, X'47), (X'54, X'55, X'56, X'57), (X'64, X'65, X'66, X'67), (X'74, X'75, X'76, X'77). In the first column arithmetic section (third arithmetic section) 3, data as third data stored in the third register file 31 is subjected to third 8-point one-dimensional inverse discrete cosine transform. The third 8-point one-dimensional inverse discrete cosine transform is realized in four parallel mode by means of the third 16-bit parallel multiply-accumulate unit 32 with polarity symmetric rounding function and the third 16-bit four parallel adder and subtracter 33. The 16-bit parallel multiply-accumulate unit 32 with polarity symmetric rounding function shifts the result in the third 8-point one-dimensional inverse discrete cosine transform 6 bits rightward to convert into an integer.

The fourth register file stores data represented by (X'00, X'01, X'02, X'03), (X'10, X'11, X'12, X'13), (X'20, X'21, X'22, X'23), (X'30, X'31, X'32, X'33), (X'40, X'41, X'42, X'43), (X'50, X'51, X'52, X'53), (X'60, X'61, X'62, X'63), (X'70, X'71, X'72, X'73). In the second column arithmetic section (fourth arithmetic section) 4, data as fourth data stored in the fourth register file 41 is subjected to fourth 8-point one-dimensional inverse discrete cosine transform. Using the 16-bit parallel multiply-accumulate unit 42 with polarity symmetric rounding function and the fourth 16-bit four parallel adder and subtracter 43, the fourth 8-point one-dimensional inverse discrete cosine transform is executed in four parallel mode. The fourth 16-bit parallel multiply-accumulate unit 42 with polarity symmetric rounding function shifts the result in the fourth 8-point one-dimensional inverse discrete cosine transform 6 bits rightward to convert into an integer.

The arithmetic result of the first column arithmetic section 3 and the arithmetic result of the second column arithmetic section 4 are output as arithmetic result of the 8×8 two-dimensional inverse discrete cosine transform.

Figure 2:
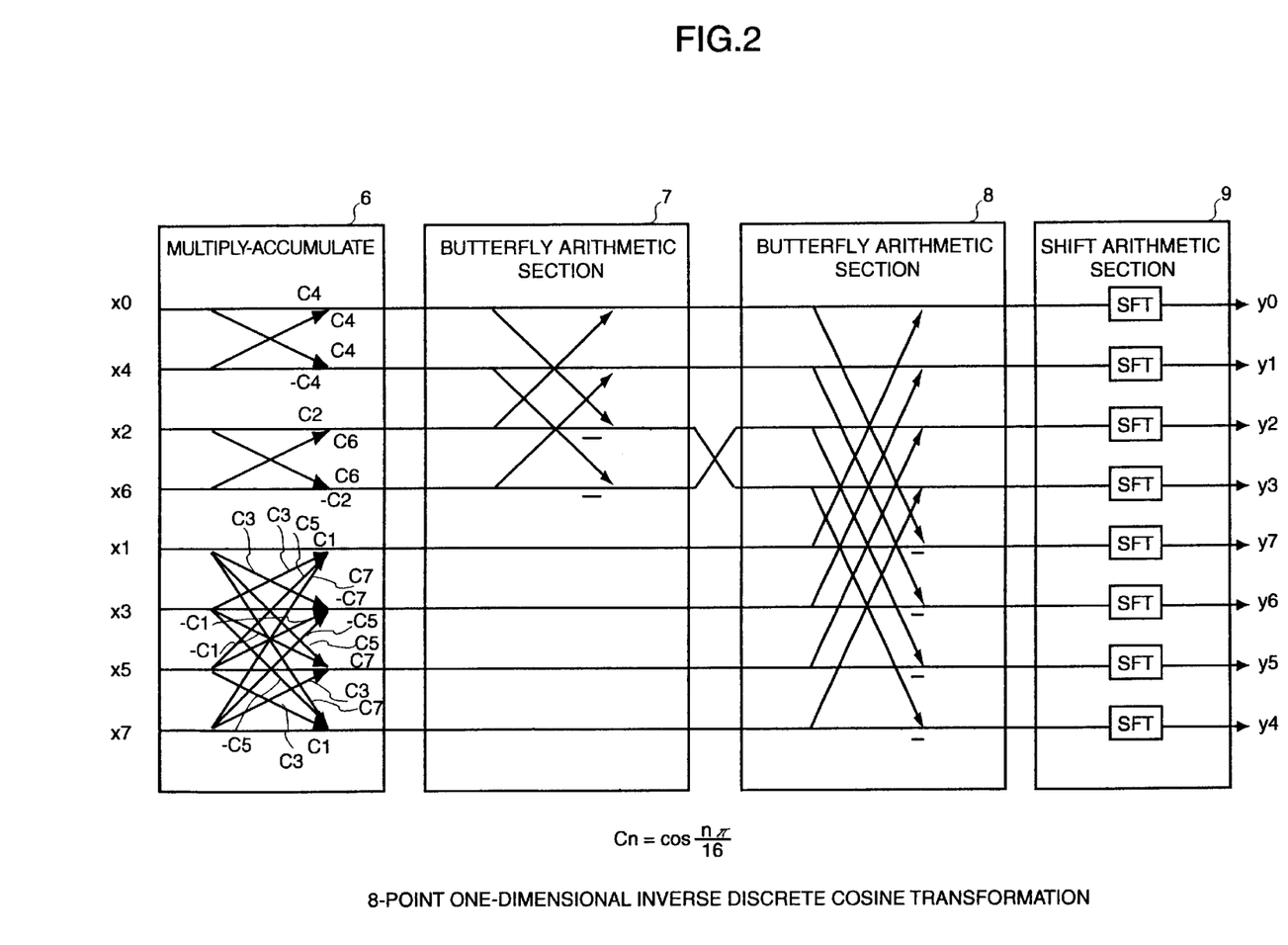
FIG. 2 is a block circuit diagram showing the configuration of an 8-point one-dimensional inverse discrete cosine transform circuit according to the present invention.

Next, the configuration of 8-point one-dimensional inverse discrete cosine transform and the configuration of the shift arithmetic operation will be described below by referring to FIG. 2. In the input data Xn (where n is an integer 0 to 7) shown in FIG. 2, the first row arithmetic section 1 implements 8-point one-dimensional inverse cosine transform of (X0n, X1n, X2n, X3n); the second row arithmetic section 2 implements 8-point one-dimensional inverse cosine transform of (X4n, X5n, X6n, X7n); the first column arithmetic section 3 implements 8-point one-dimensional inverse cosine transform of (X'n4, X'n5, X'n6, X'n7); and the second column arithmetic section 4 implements 8-point one-dimensional inverse cosine transform of (X'n0, X'n1, X'n2, X'n3). The 8-point one-dimensional inverse discrete cosine transform is executed by means of the multiply-accumulate section 6, the first butterfly arithmetic section 7, the second butterfly arithmetic section 8, and the shift arithmetic section 9. The multiply-accumulate section 6 receives X0 to X7 and then executes a multiply-accumulate operation of them. The 16-bit integer arithmetic operation is carried out in four parallel mode by using the 16-bit four parallel multiply-accumulate sections 12, 22, 32, and 42 each with polarity symmetric rounding function. The first butterfly arithmetic section 7 receives the arithmetic result of the multiply-accumulate section 6 to execute a four-point two-dimensional butterfly arithmetic operation. The second butterfly arithmetic section 8 receives the arithmetic result of the multiply-accumulate section 6 and the arithmetic result of the first butterfly arithmetic section 7 to execute an eight-point two-dimensional butterfly arithmetic operation. The 16-bit parallel adder and subtracters 13, 23, 33, 43 are used for the adding and subtracting operation in the first and second butterfly arithmetic sections 7 and 8 to realize 16-bit integer arithmetic operation in four parallel mode. In the shift arithmetic section 9, the 16-bit four parallel multiply-accumulate unit 32 with polarity symmetric rounding function shift the arithmetic result of the first column arithmetic section 3 6 bits rightward to convert it into an integer while the 16-bit four parallel multiply-accumulate unit 42 with polarity symmetric rounding function shift the arithmetic result of the second column arithmetic section 4 6 bits rightward to convert it into an integer.

The 8×8 two-dimensional discrete inverse cosine transform circuit can be realized with a microprocessor including 16-bit four parallel multiply-accumulate command with polarity symmetric rounding function. Under such a command, the first to fourth register files 11, 21, 31, and 41 are placed in the register files in the microprocessor. In the 16-bit data adding and subtracting operation, if the multiplication result of (16 bits×16 bits) is positive, a 16-bit four parallel addition and subtraction command is added to 0×4000 (in hexadecimal notation). If the multiplication result of (16 bits×16 bits) is negative, 16-bit four parallel addition and subtraction command is added to 0×3fff (in hexadecimal notation). The upper 16 bits containing one sign bit are truncated from the addition result. Finally the 16-bit data truncated is added to 16-bit data.

Next, the operation of the 8×8 two-dimensional discrete inverse cosine transform circuit according to the present invention will be described below in detail. Referring to FIG. 1, the first and second row arithmetic sections 1 and 2 simultaneously realize 8-point one-dimensional inverse discrete cosine transform for four rows in parallel by implementing 16-bit integer arithmetic operation in four parallel mode. Similarly, the first and second column arithmetic sections 3 and 4 simultaneously realizes 8-point one-dimensional inverse discrete cosine transform for four columns in parallel by implementing 16-bit integer arithmetic operation in four parallel mode.

Next, the operation of 16-bit four parallel arithmetic unit used for the 8-point one-dimensional inverse discrete cosine transform will be described below.

Figure 3:
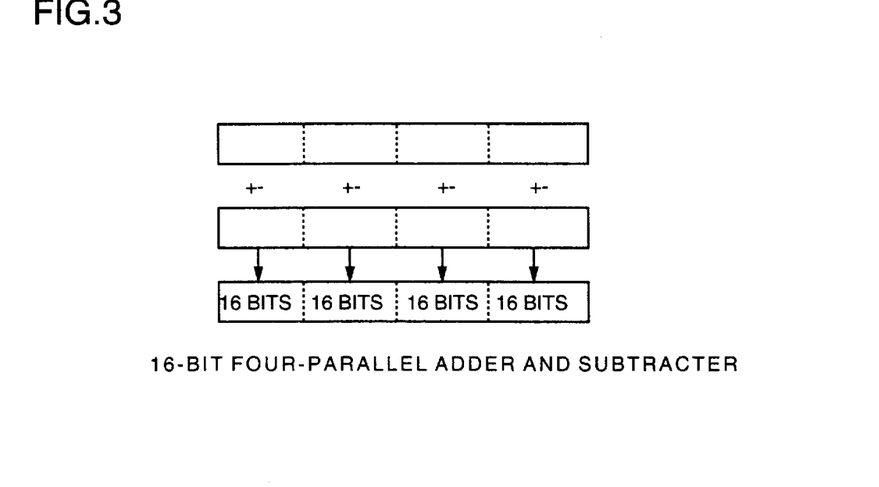
FIG. 3 is an explanatory diagram showing the operation of a 16-bit four-parallel adder and subtracter.

Each of the 16-bit four parallel adder and subtracter units 13, 23, 33, and 43, as shown in FIG. 3, implements an adding and subtracting operation of 16-bit data and 16-bit data in four parallel mode.

Figure 4:
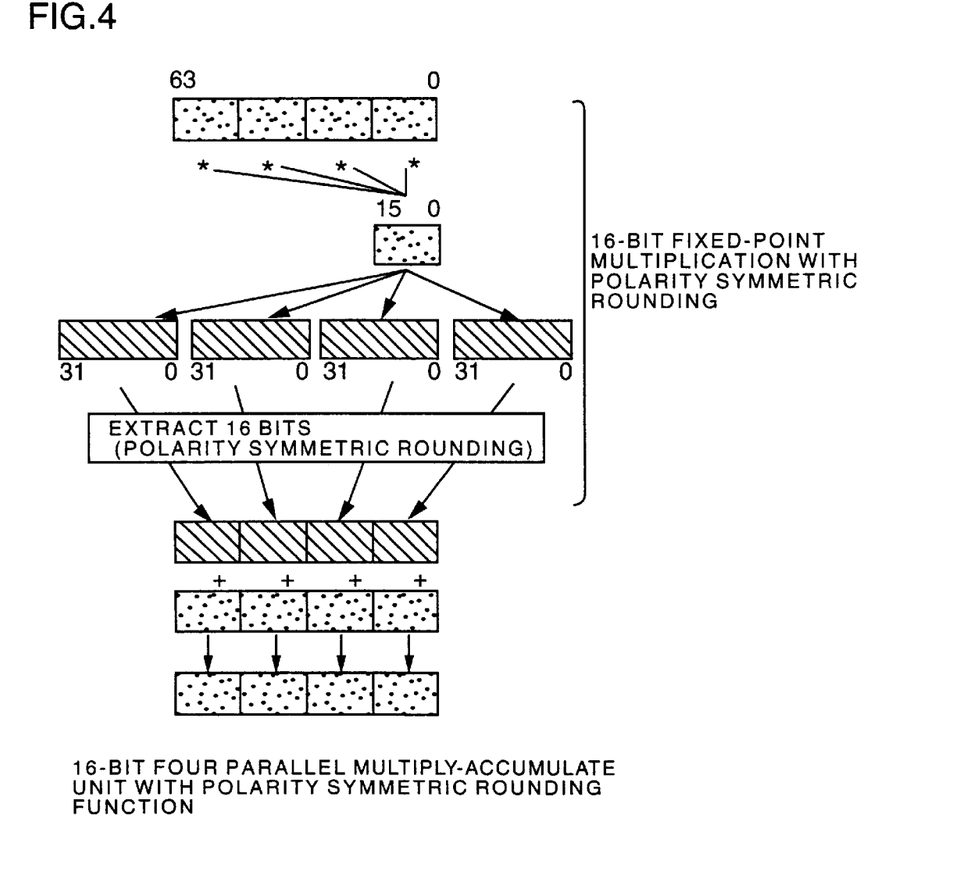
FIG. 4 is an explanatory diagram showing the operation of a 16-bit four-parallel multiply-accumulate unit with polarity symmetric rounding function.

The 16-bit four parallel multiply-accumulate units 12, 22, 32, and 42 each with polarity symmetric rounding function, as shown in FIG. 4, implement a 16-bit multiply-accumulate operation in parallel.

Figure 5:
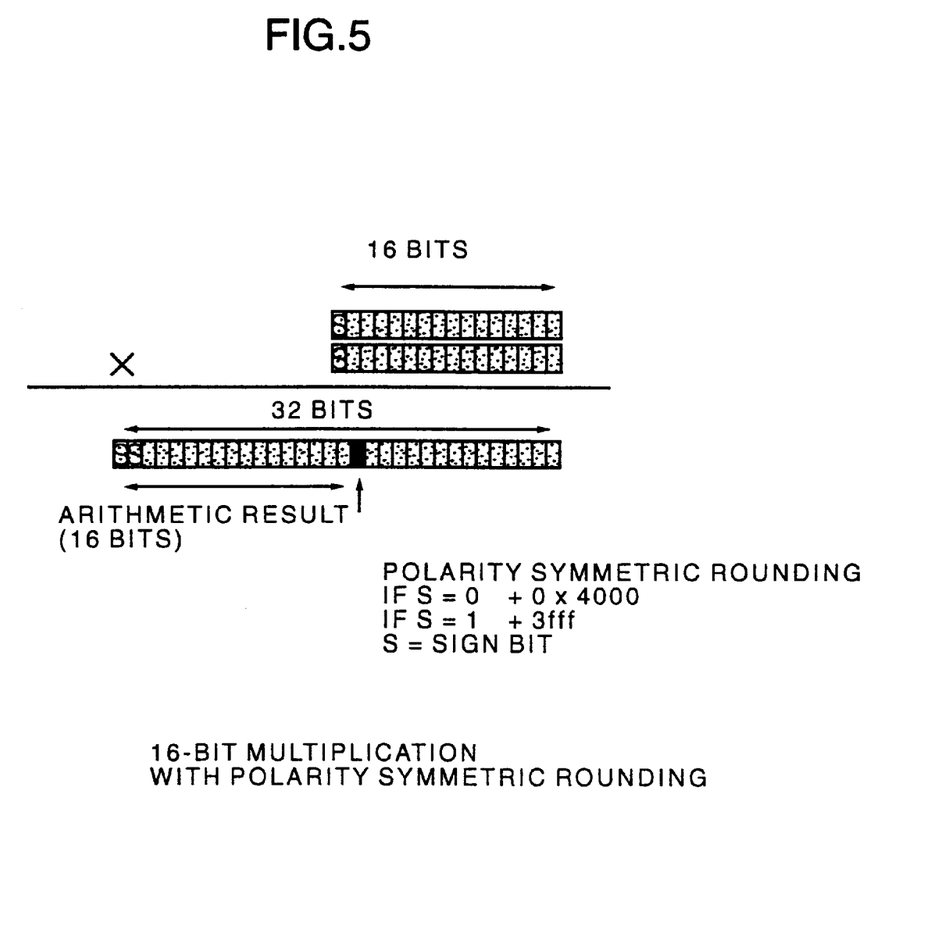
FIG. 5 is an explanatory diagram showing the operation of a 16-bit four multiplier.

In order to represent a multiplication result of (16-bit data≠16-bit data) in 16-bit format in 16-bit multiply-accumulate operation with polarity symmetric rounding function, as shown in FIG. 5, the resultant product which is positive is added to 0×4000. The resultant product which is negative is added to 0×3fff. Then 16-bits containing one sign bit is truncated in the 16-bit multiplication with polarity symmetric rounding function. The truncated result is added to 16-bit data.

In the integer conversion process by the first and second column arithmetic sections 3 and 4, the shift arithmetic operation with polarity symmetric rounding function is needed by considering the arithmetic precision. The shift arithmetic operation with polarity symmetric rounding function is realized by using the multiply-accumulate operation with polarity symmetric rounding function. In order to perform an integer conversion process by subjecting the fifth bit counted from the least significant bit to polarity symmetric rounding process and then shifting the result 6 bits rightward, the multiply-accumulate with polarity symmetric rounding function is performed on condition that the multiplication coefficient is 0×0200 and that 16-bit data to be added is zero.

It should be noted that the present invention is not limited to the above-mentioned embodiments. Various changes and modifications may be considered within the scope which does not deviate from the subject matter of the present invention.

As described above, according to the present invention, when high-speed 8×8 two-dimensional discrete inverse cosine transform is realized by implementing 16-bit integer arithmetic operation in four parallel mode, arithmetic errors can be suppressed without any increase in arithmetic amount merely by preparing a 16-bit four parallel multiply-accumulate unit with polarity symmetric rounding function, in addition to basic parallel arithmetic units for addition, subtraction and so on.

What is claimed is:

1. An 8×8 two-dimensional inverse discrete cosine transform circuit that performs an 8-point one-dimensional inverse discrete cosine transform in a row direction and then performs an 8-point one-dimensional inverse discrete cosine transform in a column direction based on the result of said 8-point one-dimensional inverse discrete cosine transform in a row direction, so that the 8×8 two-dimensional inverse discrete cosine transform is realized, comprising:

a first row arithmetic section for realizing a first 8-point one-dimensional inverse discrete cosine transform of a former part of a DCT (Discrete Cosine Transform) transformed domain signal Xij in four parallel mode to obtain a first arithmetic result, wherein i represents a horizontal address having an integer value of 0 to 7, j represents a vertical address having an integer value of 0 to 7, and said DCT transformed domain signals Xij are represented by executing horizontal direction transform and vertical direction transform and shifting by four bits leftward;

a second row arithmetic section for realizing a second 8-point one-dimensional inverse discrete cosine transform of a latter part of the DCT transformed domain signal in four parallel mode to obtain a second arithmetic result;

a replacement section for implementing a horizontal replacement of said first arithmetic result to output a first replacement result and implementing a vertical replacement of said second arithmetic result to output a second replacement result;

a first column arithmetic section for realizing a third 8-point one-dimensional inverse discrete cosine transform of said first replacement result in four parallel mode and performing integer conversion to obtain a third arithmetic result; and a second column arithmetic section for realizing a fourth 8-point one-dimensional inverse discrete cosine transform of said second replacement result in four parallel mode and performing integer conversion to obtain a fourth arithmetic result;

whereby said third arithmetic result and said fourth arithmetic result are output as arithmetic results of the 8×8 two-dimensional discrete inverse cosine transform.

2. The 8×8 two-dimensional discrete inverse cosine transform circuit of claim 1, wherein said first replacement result is represented by (X'i4, X'i5, X'i6, X'i7) and said second replacement result is represented by (X'i0, X'i1, X'i2, X'i3), provided that said former part of said DCT transformed domain signal Xij is represented by (X0i, X1i, X2i, X3i), that the latter part of said DCT transformed domain signal Xij is represented by (X4i, X5i, X6i, X7i), that said first arithmetic result is represented by (X'0i, X'1i, X'2i, X'3i), and that said second arithmetic result is represented by (X'4i, X'5i, X'6i, X'7i).

3. The 8×8 two-dimensional discrete inverse cosine transform circuit of claim 2, wherein said first row arithmetic section comprises:
a first register file;
a first 16-bit four parallel adder and subtracter;
a first 16-bit four parallel multiply-accumulate unit with polarity symmetric rounding function; and
a first multiplication coefficient holding section, and wherein said second row arithmetic section comprises:
a second register file;
a second 16-bit four parallel adder and subtracter;
a second 16-bit four parallel multiply-accumulate unit with polarity symmetric rounding function; and a second
multiplication coefficient holding section, and wherein said first column arithmetic unit comprises:
a third register file;
a third 16-bit four parallel adder and subtracter;
a third 16-bit four parallel multiply-accumulate unit with polarity symmetric rounding function; and
a third multiplication coefficient holding section, and wherein said second column arithmetic section comprises:

a fourth register file;
a fourth 16-bit four parallel adder and subtracter;
a fourth 16-bit four parallel multiply-accumulate unit with polarity symmetric rounding function; and
a fourth multiplication coefficient holding section.

4. The 8×8 two-dimensional discrete inverse cosine transform circuit of claim 3, wherein each of said first to fourth 16-bit arithmetic four parallel adder and subtracter comprises a circuit that can realize addition and subtraction of 16-bit data in four parallel mode; and wherein each of said first to fourth 16-bit four parallel multiply-accumulate units with polarity symmetric rounding function comprises a circuit that adds 0×4000 (in hexadecimal notation) to a multiplication result when the multiplication result of (16 bits×16 bits) is positive, or adds 0×3fff (in hexadecimal notation) to a multiplication result when the multiplication result of (16 bits×16 bits) is negative, and then truncates the upper 16 bits containing one sign bit, and then adds 16-bit data to the truncated 16-bit data.

5. The 8×8 two-dimensional discrete inverse cosine transform circuit of claim 4, wherein said first row arithmetic section writes the former part of said DCT transformed domain signal Xij (X0i, X1i, X2i, X3i) as first input data into said first register file, implements a multiply-accumulate operation of said first input data by means of said first 16-bit four parallel multiply-accumulate unit with polarity symmetric rounding function, implements an adding and subtracting operation by means of said first 16-bit four parallel adder and subtractor, and stores said first arithmetic result (X'0i, X'1i, X'2i, X'3i) into said first register file;

wherein said second row arithmetic section writes the latter part of said DCT transformed domain signal Xij (X4i, X5i, X6i, X7i) as second input data into said second register file, implements a multiply-accumulate operation of said second input data by means of said second 16-bit four parallel multiply-accumulate unit with polarity symmetric rounding function, implements an adding and subtracting operation by means of said second 16-bit four parallel adder and subtracter, and stores said second arithmetic result (X'4i, X'5i, X'6i, X'7i) into said second register file; wherein said replacement section executes horizontal and vertical replacement of said first arithmetic result (X'0i, X'1i, X'2i, X'3i) and said second arithmetic result (X'4i, X'5i, X'6i, X'7i), stores said first replacement result (X'i4, X'i5, X'i6, X'i7) into said third register file and stores said second replacement result (X'i0, X'i1, X'i2, X'i3) into fourth register file;

wherein said first column arithmetic section implements a multiply-accumulate operation of said first replacement data as third input data stored in said third register file by means of said third 16-bit four parallel multiply-accumulate unit with polarity symmetric rounding function, implements an adding and subtracting operation by means of said third 16-bit four parallel adder and subtracter, so that said third 8-point one-dimensional inverse discrete cosine transform is realized in four parallel mode and an integer conversion operation is performed by means of said third 16-bit four parallel multiply-accumulate unit with polarity symmetric rounding function; and wherein said second column arithmetic section implements a multiply-accumulate operation of said second replacement data as fourth input data stored in said fourth register file by means of said fourth 16-bit four parallel multiply-accumulate unit with polarity symmetric rounding function, implements an adding and subtracting operation by means of said fourth 16-bit four parallel adder and subtracter, so that said fourth 8-point one dimensional inverse discrete cosine transform is realized in four parallel mode and an integer conversion operation is performed by means of said fourth 16-bit four parallel multiply-accumulate unit with polarity symmetric rounding function.

6. A microprocessor for 8×8 two-dimensional inverse discrete cosine transform, comprising:

an 8×8 two-dimensional inverse discrete cosine transform circuit that performs an 8-point one-dimensional inverse discrete cosine transform in a row direction and then performs an 8-point one-dimensional discrete inverse cosine transform in a column direction based on the result of said 8-point one-dimensional inverse discrete cosine transform in a row direction, so that 8×8 two-dimensional inverse discrete cosine transform is realized, including:

a first row arithmetic section for realizing a first 8-point one-dimensional inverse discrete cosine transform of a former part of a DCT (Discrete Cosine Transform) transformed domain signal Xij in four parallel mode to obtain a first arithmetic result, wherein i represents a horizontal address having an integer value of 0 to 7, j represents a vertical address having an integer value of 0 to 7, and said DCT transformed domain signals Xij are represented by executing horizontal direction transform and vertical direction transform and shifting by four bits leftward;

a second row arithmetic section for realizing a second 8-point one-dimensional inverse discrete cosine transform of the latter part of the DCT transformed domain signal Xij in four parallel mode to obtain a second arithmetic result;

a replacement section for implementing a horizontal replacement of said first arithmetic result to output a first replacement result and implementing a vertical replacement of said second arithmetic result to output a second replacement result;

a first column arithmetic section for realizing a third 8-point one-dimensional inverse discrete cosine transform of said first replacement result in four parallel mode and performing integer conversion to obtain a third arithmetic result; and a second column arithmetic section for realizing a fourth 8-point one-dimensional inverse discrete cosine transform of said second replacement result in fourth parallel mode and performing integer conversion to obtain a fourth arithmetic result;

whereby said third arithmetic result and said fourth arithmetic result are output as arithmetic results of the 8×8 two-dimensional discrete inverse cosine transform;

said microprocessor having a 16-bit four parallel addition and subtraction command and a 16-bit four parallel multiply-accumulate command with polarity symmetric rounding function.

7. The microprocessor of claim 6, wherein said 16-bit four parallel addition and subtraction command is a command that implements an adding and subtracting operation of 16-bit data in four parallel mode; and wherein said 16-bit four parallel multiply-accumulate operation with said polarity symmetric rounding operation is a command that implements an multiply-accumulate operation with polarity symmetric rounding operation in four parallel mode, said command which adds 0×4000 (in hexadecimal notation) to a 16×16 bit multiplication result when said 16×16 bit multiplication result is positive, or adds 0×3fff (in hexadecimal notation) to a 16×16 bit multiplication result when said 16×16 bit multiplication result is negative, truncates the upper 16 bits containing one sign bit from said resultant sum, and adds said truncated 16-bit data to 16-bit data.

8. A method of implementing 8×8 two-dimensional inverse discrete cosine transform, comprising the steps of:

realizing a first 8-point one-dimensional inverse discrete cosine transform of a former part of a DCT (Discrete Cosine Transform) transformed domain signal Xij in four parallel mode to obtain a first arithmetic result, wherein i represents a horizontal address having an integer of 0 to 7, j represents a vertical address having an integer of 0 to 7, and said DCT transformed domain signal Xij is represented by executing horizontal direction transform and vertical direction transform and shifting by four bits leftward;

realizing a second 8-point one-dimensional inverse discrete cosine transform of a latter part of said DCT transformed domain signal Xji in four parallel mode to obtain a second arithmetic result;

implementing a horizontal replacement of said first arithmetic result to output a first replacement result and implementing a vertical replacement of said second arithmetic result to output a second replacement result;

realizing a third 8-point one-dimensional inverse discrete cosine transform of said first replacement result in four parallel mode and performing integer conversion to obtain a third arithmetic result;

realizing a fourth 8-point one-dimensional inverse discrete cosine transform of said second replacement result in four parallel mode and performing integer conversion to obtain a fourth arithmetic result; and outputting said third arithmetic result and said fourth arithmetic result as arithmetic results of the 8×8 two-dimensional discrete inverse cosine transform.

9. The method of claim 8, further comprising the steps of:

realizing addition and subtraction of 16-bit data in four parallel mode;

adding 0×4000 (in hexadecimal notation) to a multiplication result when the multiplication result of (16 bits×16 bits) is positive, or adding 0×3fff (in hexadecimal notation) to a multiplication result when the multiplication result of (16 bits×16 bits) is negative, truncating the upper 16 bits containing one sign bit, and then adding 16-bit data to the truncated 16-bit data.

10. The method of claim 9, further comprising the steps of:

writing the former part of said DCT transformed domain signal Xij (X0i, X1i, X2i, X3i) as first input data into a first register file, implementing a multiply-accumulate operation of said first input data by means of a first 16-bit four parallel multiply-accumulate unit with polarity symmetric rounding function, implementing an adding and subtracting operation by means of a first 16-bit four parallel adder and subtracter, and then storing said first arithmetic result (X'0i, X'1i, X'2i, X'3i) into said first register file;

writing the latter part of said DCT transformed domain signal Xij (X4i, X5i, X6i, X7i) as second input data into a second register file, implementing a multiply-accumulate operation of said second input data by means of a second 16-bit four parallel multiply-accumulate unit with polarity symmetric rounding function, implementing an adding and subtracting operation by means of a second 16-bit four parallel adder and subtracter, and then storing said second arithmetic result (X'4i, X'5i, X'6i, X'7i) into said second register file;

substituting horizontally and vertically said first arithmetic result (X'0i, X'1i, X'2i, X'3i) and said second arithmetic result (X'4i, X'5i, X'6i, X'7i), storing horizontally and vertically said first replacement result (X'i4, X'i5, X'i6, X'i7) into a third register file and storing said second replacement result (X'i0, X'i1, X'i2, X'i3) into a fourth register file;

implementing a multiply-accumulate of said first replacement data as third input data stored in said third register file by means of a third 16-bit four parallel multiply-accumulate unit with polarity symmetric rounding function, implementing an adding and subtracting operation by means of a third 16-bit four parallel adder and subtracter, so that said third 8-point one dimensional inverse discrete cosine transform is realized in four parallel mode and an integer operation is performed by means of said third 16-bit four parallel multiply-accumulate unit with polarity symmetric rounding function; and implementing a multiply-accumulate of said second replacement data as fourth input data stored in a fourth register file by means of a fourth 16-bit four parallel multiply-accumulate unit with polarity symmetric rounding function, implementing an adding and subtracting operation by means of a fourth 16-bit four parallel adder and subtracter, so that said fourth 8-point one dimensional inverse discrete cosine transform is realized in four parallel mode and an integer operation is performed by means of said fourth 16-bit four parallel multiply-accumulate unit with polarity symmetric rounding function.

\* \* \* \* \*